May 4, 1965  H. TROEGER  3,181,851
FLEXURAL PIVOT

Original Filed Oct. 3, 1961

INVENTOR.
HENRY TROEGER
BY
*William L. Thompson*
ATTORNEY

May 4, 1965 H. TROEGER 3,181,851
FLEXURAL PIVOT
Original Filed Oct. 3, 1961 2 Sheets-Sheet 2

INVENTOR.
HENRY TROEGER
BY
William S. Thompson
ATTORNEY

United States Patent Office 3,181,851
Patented May 4, 1965

3,181,851
FLEXURAL PIVOT
Henry Troeger, Cooperstown, N.Y., assignor to The Bendix Corporation, a corporation of Delaware
Original application Oct. 3, 1961, Ser. No. 142,724, now Patent No. 3,124,873, dated Mar. 17, 1964. Divided and this application June 17, 1963, Ser. No. 295,857
3 Claims. (Cl. 267—1)

This is a division of application Serial No. 142,724, filed October 3, 1961, now Patent No. 3,124,873, granted March 17, 1964.

This invention relates to devices for supporting a mechanism which is to be limitedly rotated about an axis and more particularly concerns improvements in flexural pivot devices which provide limited relative rotation between two parts by flexing cross flat springs connecting the two parts.

An object of the present invention is to provide an improved method for making a flexural pivot device which is simply constructed and can be made in small sizes and which retains the advantages of no backlash and no friction or wear with resulting limitations due to lubrication at high temperature.

A further object is the provision of an improved flexural pivot device which has axially-aligned tubular members connected by structure including crossed flat springs whereby the device can be simply mounted in support structure and can provide a friction-free sensitive pivotal mounting suitable for high temperature applications.

Another object is to provide a simplified method for more economically manufacturing flexural pivot devices wherein four arcuate quadrant elements and flat springs are assembled, bonded as a unit and then with outer sleeve means cut to form a flexural pivot construction.

The realization of the above objects along with the features and advantages of the invention will be apparent from the following description and the accompanying drawing in which.

Figure 1:
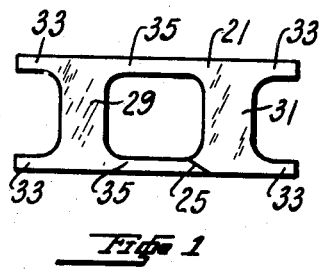
FIGURE 1 is a side view of a square D-shaped flat spring element.
Figure 2:
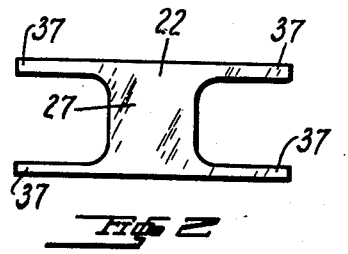
FIGURE 2 is a side view of an I-shaped flat spring element.
Figure 3:
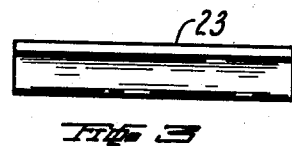
Figure 4:
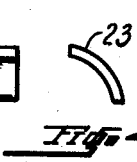
Figure 5:
Figure 6:
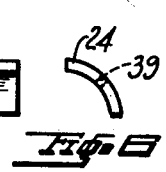
Figure 7:
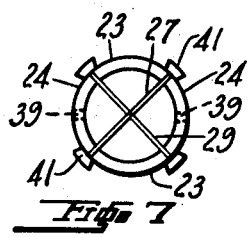
Figure 8:
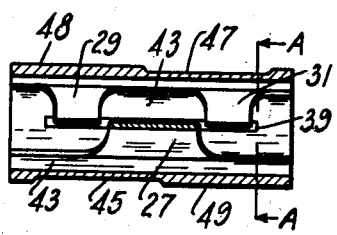
Figure 9:
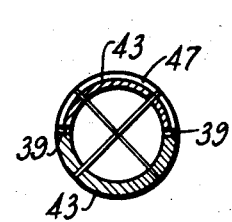
Figure 10:
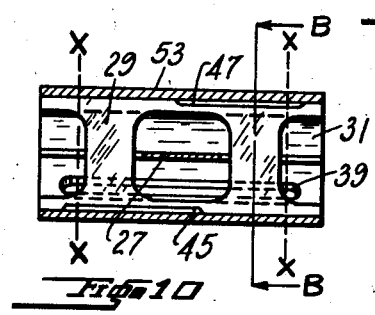
Figure 11:
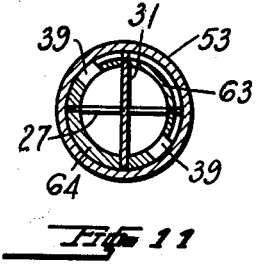
Figure 12:
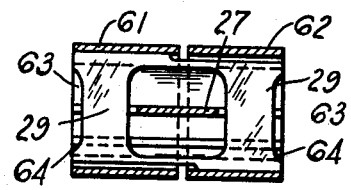
Figure 13:
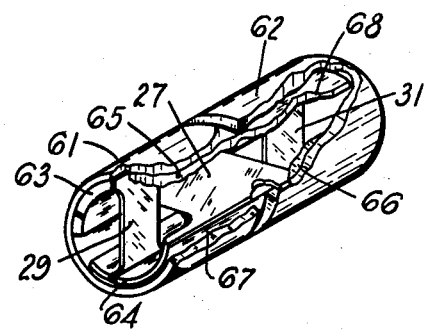
Figure 14:
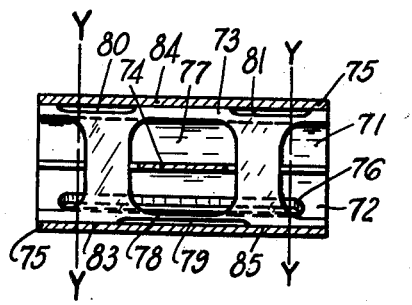
Figure 15:
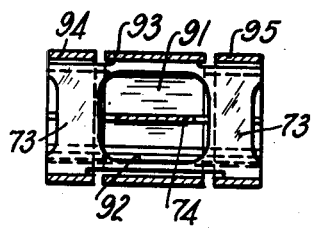

FIGURES 3 and 4 are respectively side and end views of a quadrant without an axial-extending opening, FIGURES 5 and 6 are respectively side and end views of a quadrant having an axially-extending opening, FIGURE 7 is an end view of a tubular assembly comprised of four quadrants and two crossed springs received between the axial edges of the quadrants which assembly is held for a bonding operation by fixture means, FIGURE 8 is a cross-sectional side view of the bond tubular assembly of FIGURE 7 after reducing the outer diameter at diagonally opposite locations, FIGURE 9 is a transverse cross-section taken on line A—A of FIGURE 8 and shows the axially-extending openings and the outer reduced diameter part opposite the larger diameter mounting part, FIGURE 10 is a side cross-sectional view of a tubular arrangement comprised of the inner tubular assembly of FIGURE 8 and an outer encasing sleeve, FIGURE 11 is an end cross-sectioned view along the line B—B of FIGURE 10, FIGURE 12 is a side cross-sectioned view of the cantilever-type flexural pivot after the ends have been removed from the FIGURE 10 arrangement and a center cut has been made whereby one end can be rotated relative to the other end, FIGURE 13 is a partially-broken-away perspective view of the FIGURE 12 type of flexural pivot and more clearly shows the connection of finger-like arcuate elements having crossed springs to the outer mounting and support members at each end, FIGURE 14 is a side cross-section of a bonded tubular arrangement adapted to be cut to provide a double end-supported flexural pivot and FIGURE 15 is a side cross-section of a double-end-supported pivot which results from cutting off the ends of the FIGURE 14 structure and making two end cuts to the space at the inner ends of reduced ing two end part cuts to the space at the inner ends of reduced diameter outer surfaces of the inner tubular assembly.

Referring to FIGS. 1–7 it can be realized that two flat springs 21 and 22 and four sleeve quadrants 23 and 24 are assembled as in FIG. 7 to provide a tubular assembly. I-shaped spring 22 is slipped through insertion opening 25 in the square-D-shaped spring 21 and the cross element 27 is arranged perpendicular to cross bars 29 and 31 of the square-D-shaped spring 21. Spring 21 has at each end of its cross bars 29 and 31 projections or fingers 33 extending perpendicularly. Parts 35 between each end of cross bars 29 and 31 can also be referred to as projections. I-shaped spring 22 also has projections 37. It is to be noted that the cross bars 29 and 31 and cross element 27 merge on a radius to the various projections whereby the crossed spring elements are better supported and more durable under flexing when brazed to the quadrants and other structure as will be described. It is apparent that two generally I-shaped springs can be used provided the effective width is about equal, as with the total width of the two cross bars 29 and 31 relative to the cross element 27. The various projections, of course, have the same thickness as the cross members since the springs are made from metal sheet.

Quadrants 24 have axially-extending openings 39 which extend lengthwise to adjacent the ends of the quadrants 24 and are opposed in the assembly. These openings 39 become slots which permit pivoting or relative rotation, with flexing of the flat crossed springs as will appear, after the further fabrication including bonding as by brazing using flash electroplated depositions or other means.

As seen in FIG. 7, the tubular assembly is held together with the elongated quadrants 23 and 24 on a common circle and the ends and projections of the flat springs 21 and 22 positioned between the axial edges of the quadrants. Four fixture elements 41 having curved surfaces for abutting the end edge of the springs and at each side adjacent surfaces of the various quadrants. In place of fixture elements 41, a coiled wire can be used. Both fixture devices would be coated with a "stop-off" agent to prevent adherence to the quadrants or spring edges.

In FIGS. 8 and 9, the bonded tubular assembly is shown. This assembly has semi-circular rib parts 43 between the axial openings 39 and the two flat crossed springs 21 and 22 extend between these ribs 43. It is to be noted that the ends of openings 39 are slightly outward of the radius part of the cross-bars 29 and 31 of spring 21. At diagonally-opposite locations the rib parts 43 are formed or machined by grinding so that halves have reduced-diameter outer surfaces 45 and 47. These surfaces overhang each other at the center for a purpose that will be explained. The remaining surfaces 48 and 49 of the rib parts 43 at the left and right have the original diameter of the quadrant circle and serve as mounting surfaces.

To obtain the tubular assembly of FIGS. 8 and 9 the springs 21 and 22 or at least the ends and projections 33 and 37 thereof are thinly coated with a suitable bonding material or agent. Quadrants 23 and 24 are similarly coated, at least the axial edge portions thereof. As mentioned, electroplating can be used for coating. In some cases, a braze or solder material can be used and applied by brush coating. The bonding material will, of course, vary with the material from which the quadrants 23 and 24, and springs 21 and 22 are made. For example, with brass or bronze quadrants a suitable low-melting solder is applied as a thin coating. With steel quadrants, suitable lower-melting metals are thinly electroplated on the contact or bonding surfaces or these surfaces are thinly-coated with a suitable brazing material. The bonding in some cases can also be effected by using epoxy resin cement. Depending on the temperature at which bonding is effected, certain steel springs or quadrants are heat treated as required during and after bonding. Since the flexural pivot device of the present invention can be made in sizes from about one-eighth of an inch in diameter for instruments to about three inches in diameter for flight control surface elements, it is apparent that the size, the loading, the temperature conditions and other factors will govern the selection of the bonding agent and the material for the quadrants or springs.

After forming the tubular structure or assembly, the mounting surfaces 48 and 49 at least are coated. The inner surface of a tubular sleeve 53 is also coated and the sleeve 53 is forced over or encases the tubular assembly to give the tubular arrangement shown by FIGS. 10 and 11. After bonding and heat treating for spring characteristics and/or hardness, it is apparent that the inner tubular assembly will be connected at mounting surfaces 48 and 49 to the outer sleeve 53. Next, the ends of the tubular arrangement are cut-off at a plane inwardly of the ends of openings 39 at line X—X to give inner semi-circular members. By cutting along lines X—X axially inwardly of the ends of openings 39, openings 39 now extend to the ends of quadrants 24 dividing the quadrants into two segments each of 45° or less angular width. Each quadrant 24 may now be termed a divided quadrant. A center cut is then made at the overhanging parts of reduced-diameter surfaces 45 and 47 which are radially-spaced from the inner surface of sleeve 53 and are at diagonally opposite locations. It is to be noted that the width of the openings 39 in FIGS. 10–13 is larger than in FIGS. 7–9 to show different travel limits.

In FIGS. 12 and 13, the completed cantilever flexural pivot is shown and it can be seen that, after the above-described manufacturing steps, there are two outer sleeve means or tubular members 61 and 62 and two arcuate semi-circular inner elements 63 and 64. The axially-aligned outer members 61 and 62 are axially-spaced and separated at the peripheral opening formed by the midpoint cutting operation while the inner arcuate elements or two semi-circular means 61 and 62 result from the cutting at both ends through axial openings 39. The left tubular member 61 is bonded to mounting surface 48 of the upper arcuate element 63. The right tubular member 62 is likewise bonded to the mounting surface 49 of the lower arcuate element 64. The effective angle included between the adjacent edges of the arcuate elements 63 and 64 is thirty degrees and this angle can have a range of fifteen to forty-five degrees. The adjacent axially-extending edges of elements 63 and 64 provide stop means to limit safely the flexing of springs and to limit the relative rotation of members 61 and 62.

It is to be noted in FIG. 13 that arcuate elements 63 and 64 respectively include mounting-surface sections 64 and 66 and axially-extending reduced diameter sections 67 and 68 which project into left and right tubular members 61 and 62 and are radially-spaced therefrom. Springs 21 and 22 are firmly bonded between the edges of the quadrants and confined by the outer sleeves so that attachment is maintained under adverse flexing conditions and further so that relative axial movement or tilting between the left and right tubular members 61 and 62 is prevented. Crossed springs 27, 29 and 31 provide a rotational axis adjacent to the intersections of the springs. The two identical constructions provided by tubular member 61 with arcuate element 63 and tubular member 62 with arcuate element 64 can be referred to as two cylindrical means each having inwardly-projecting arcuate structures which have finger-like means extending axially. For the left cylindrical means, the arcuate structure consists of mounting-surface section 65 and reduced diameter section 68 which forms the finger-like means extending axially into and radially-spaced from the right cylindrical means. For the right cylindrical means, the arcuate structure is formed by mounting-surface section 66 and the reduced-diameter section 67 which forms the finger-like means extending axially into and radially-spaced from the left cylindrical means. With this terminology, the facing parts of arcuate structures are connected by the springs whereby relative rotation between the two cylindrical means on a common axis can be effected. The arcuate structures limit this rotation. The finger-like sections 67 and 68 are spaced radially sufficiently so that contact is prevented during relative rotation of members 61 and 62 when the springs are flexed.

The operation of the FIGS. 12 and 13 flexural pivot device as a pivotal mounting is believed to be apparent from the foregoing description. Thus, with reference to FIG. 13 an instrument indicator, one end of a butterfly valve, a turbine engine control vane, one end of flight vehicle control surface or many other devices which are usually mounted in bearings and have limited rotation or pivoting is mounted on the left tubular member 61 and the right tubular member 62 is mounted in a hole in support structure and fixed by a set pin or other conventioned arrangement. When the instrument indicator, for example, is actuated in a clockwise direction, the left tubular member 61 is rotated clockwise from normal position with the flexing of the springs 27, 29 and 31 as is well known in flexural pivot devices. The radial-spacing between the axially-extending finger-like sections 67 and 68 and the facing tubular members 61 and 62 provides clearance upon the flexing or bending of the springs. Rotation can be made in either direction as limited by the abutment of the axially-extending edges of the arcuate elements 63 and 64.

It is to be noted that the present easily-replaceable flexural pivot is made from a relatively few parts (which are connected by two simple bonding steps) and is more compact for a given capacity than constructions which have springs connected by screws to non-tubular mounting means. Further, stop or limit means are provided in the compact unitized construction of the present invention which permits also economically use in small-size applications.

Referring to FIGS. 14 and 15, it is apparent that, by a similar fabricating method, a double-end-supported flexural pivot is provided. Thus, four quadrants 71 and 72 and two springs 73 and 74 are assembled and bonded to provide a tubular assembly which then is encased by a tubular sleeve 75 to give a tubular arrangement which can be conveniently bonded in a furnace when contact surfaces, at least, are coated with a bonding material as above-described. Two quadrants 72 are formed with two axially-extending openings 76 (one appearing) at diametrical locations to provide ribs 77 and 78 between the openings 76. A central reduced-diameter surface 79 is formed in rib 78 and, diagonally-opposite, two reduced-diameter outer surfaces 80 and 81 are formed in each end part of rib 77 which results in mounting surfaces 83, 84 and 85. As with the cantilever-type pivot, springs 73 and 74 are mounted between the axial edges of the quadrants to provide crossed flat springs in perpendicular radial planes. Positioning the sleeve 75 on the tubular assembly provides the arrangement (shown in FIG. 14) which has overhanging recesses. It is apparent the tubular assembly has semi-circular ribs 77 and 78 between axial openings 76 which are bonded at respective ends to sleeve 75.

After bonding as above described, the ends of sleeve 75 and the ribs 77 and 78 are severed through openings 76 along lines Y—Y to provide two semi-circular arcuate elements 91 and 92 and the sleeve wall is cut through at the outer ends of the bottom recess and the inner ends of the top recesses to provide a center tubular or ring-like member 93 and two end tubular or ring-like members 94 and 95, as shown in FIG. 13. Arcuate element 91 is bonded to the two outer end members 94 and 95 and arcuate element 92 is bonded to center member 93 while the springs 73 and 74 connect the arcuate elements at axially-spaced locations. The transverse cross sections would be essentially the same as shown for the above-described cantilever embodiment. As mentioned above, this angle can be within the range of fifteen to forty-five degrees.

It is to be noted that end members 94 and 95 and center member 93 constitute with elements 91 and 92 (after the bonding) two cylindrical means having inwardly-projecting, diametrically-located arcuate structures which have finger-like means extending axially. As thus described, the opposed or facing arcuate structures are connected by flat springs so that the cylindrical means can be rotated relative to each other and the arcuate structures provide for limited relative rotation of the axially-spaced cylindrical means arranged on a common axis. The radial-spacing of the finger-like means is such that clearance is provided to prevent contact when the cylindrical means are rotated.

The operation of the flexural pivot device of FIG. 15 is basically as above-described except that support is provided at each end by anchoring both tubular end members 94 and 95. Thus, a device mounted on the center tubular member 93 can be rotated a limited extent and will be double-end supported by the fixed end members 94 and 95. Such rotation is effected by flexing springs 73 and 74 and can be made in either direction as limited by the side abutment of the arcuate elements 91 and 92.

It is to be understood that changes can be made in the disclosed embodiments and methods by persons skilled in the art without departing from the invention as set forth in the appended claims.

What is claimed is:

1. A flexural pivot comprised of a pair of flat crossed springs, each of said crossed springs having at least one side projection at each end, each said side projection extending perpendicularly from the side end of its spring and being the same thickness as said spring to provide connecting segments, two arcuate quadrant elements and two arcuate divided-quadrant elements positioned alternately between said connecting segments and connected thereto to provide a tubular assembly having two semi-circular-like members interconnected by crossed flat springs and spaced at the lengthwise edges thereof, first outer sleeve means connected to one of said semi-circular-like members and radially spaced from the other member, second outer sleeve means connected to the other of said semi-circular-like members and radially-spaced from the one member, whereby said first outer sleeve means can be fixed and said second outer sleeve means can be rotated with flexing of said crossed springs.

2. The flexural pivot according to claim 1 and being further characterized in that said first sleeve means is a ring-like element and said second sleeve means is a ring-like element axially spaced from said first-mentioned ring-like element to provide a cantilever pivot.

3. The flexural pivot according to claim 1 and being further characterized in that said first sleeve means is a centrally-located ring-like element and said second sleeve means is two ring-like elements axially-spaced from each end of said centrally-located ring-like element to provide a double-end-supported-pivot.

References Cited by the Examiner
UNITED STATES PATENTS
3,073,584   1/63   Toeger.

ARTHUR L. LA POINT, *Primary Examiner.*